Oct. 5, 1926.
M. W. McCONKEY
1,601,804
AUTOMOBILE COLLISION BUMPER
Filed Jan. 30, 1925
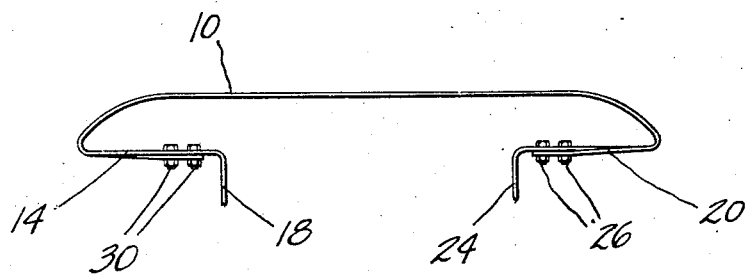
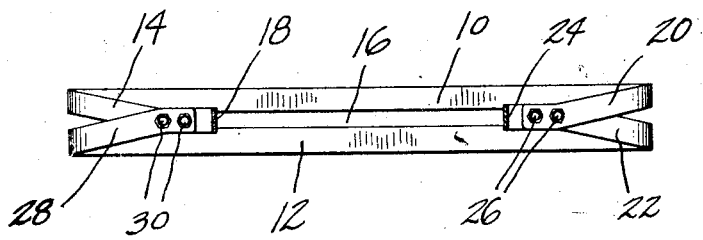
Inventor
Montgomery W. McConkey
By Blachmore, Spencer & Flint
Attorneys Patented Oct. 5, 1926.

1,601,804

UNITED STATES PATENT OFFICE.

MONTGOMERY W. McCONKEY, OF FERNDALE, MICHIGAN, ASSIGNOR TO GENERAL MOTORS CORPORATION, OF DETROIT, MICHIGAN, A CORPORATION OF DELAWARE.

AUTOMOBILE COLLISION BUMPER.

Application filed January 30, 1925. Serial No. 5,777.

This invention relates to automobile collision bumpers and has for its object the provision of a relatively inexpensive bumper which is strong in construction. In one form the bumper is made up of two parts which are substantially alike except that one is reversed with respect to the other, and which together include a pair of vetrically spaced substantially parallel impact bars adapted to extend across one end of an automobile. The opposite ends of the two bars are bent rearwardly and inwardly, to form looped end portions, and are additionally bent in a vertical plane edgewise to bring them into horizontal alinement with the space between the impact portions of the two bars. Each of these ends is then extended rearwardly to be attached directly to the chassis frame of an automobile and thus form a supporting bracket for the bumper. The other ends of the two bars are relatively short and each of them is bent rearwardly and inwardly and vertically and connected at its extreme end to the longer end of the opposite bar.

The above and other desirable features of construction will be apparent from the following description of one illustrative embodiment shown in the accompanying drawings, in which:—

Figure 1 is a top plan view of the bumper; and

Figure 2 is a rear elevation of the bumper.

In the arrangement selected for illustration the bumper comprises essentially two substantially identical bars which are reversed with respect to each other and which include vertically spaced substantially parallel upper and lower impact portions 10 and 12. The upper bar 10 is shown as being bent around at its left end rearwardly and inwardly to form a looped end portion 14 which is additionally bent edgewise in a vertical plane to bring it into horizontal alinement with the space 16 between the impact portions 10 and 12. The looped portion 14 is then extended rearwardly to form a bracket portion 18 to be secured in any desired manner to the chassis frame of an automobile. At its opposite end the bar 10 is bent around rearwardly and inwardly to form a substantially short looped end 20 which is additionally bent edgewise in a vertical plane so that it terminates substantially in horizontal alinement with the space 16.

The bar 12 is bent at its right end rearwardly and inwardly and upwardly to form a looped end portion 22 which is brought into horizontal alinement with the space 16 and which then extends rearwardly to form an attaching bracket portion 24. The short looped end 20 of the bar 10 is secured by bolts or the like 26 to the looped part 22 of the bar 12. At its opposite end the bar 12 is bent around to form a relatively short looped end 28 which is additionally bent edgewise in a vertical plane to terminate in horizontal alinement with the space 16 and which is secured by bolts or the like 30 to the looped end 14 of the bar 10.

While one illustrative embodiment of the invention has been described in detail, it is not my intention to limit its scope to that particular embodiment, or otherwise than by the terms of the appended claims.

I claim:—

1. An automobile collision bumper comprising two vertically spaced substantially parallel impact bars adapted to extend across one end of an automobile, the bars being bent at their opposite ends rearwardly and inwardly and also bent edgewise in a vertical plane into horizontal alinement with the space between the front impact portions, and then one end of each extended rearwardly to form attaching brackets, the other ends of the two bars being bent rearwardly and inwardly and edgewise in a vertical plane to form relatively short looped ends secured respectively at their extremities to the longer looped ends of the opposite bars.

2. An automobile bumper comprising two vertically spaced, superimposed spring bars being normally straight throughout the greater portion of their length, the straight portion extending into a gradually developed oblique rearward curve from which the ends of the said bars develop into converging and parallel disposition with respect to one another, means to fasten the bars together at the last named point, and supporting brackets each formed integral with each of the said bars and arranged to attach the said bumper to an automobile frame.

3. An automobile bumper comprising, in combination, a pair of vertically spaced superimposed spring bars formed with a substantially flat body portion, the ends made up of gradually developed curves which bend abruptly into short, flat, inward, converging extensions substantially flat and parallel with respect to the aforementioned body portion, means to retain the said bars in fixed position with respect to each other extending through the said converging extensions, and supporting brackets each comprising an integral extension of each of the said bars.

4. An automobile bumper comprising two vertically spaced superimposed substantially parallel impact bars, the ends of the bars at their opposite ends being bent rearwardly, inwardly, and vertically to overlap each other, then further bent to dispose the extreme overlapping portions in a horizontal plane, the edges thereof coinciding with one another, means at the last named points to clamp the said bars together and maintain the central portions in spaced relation from one another, and rearward angular extensions of each end of each of said bars respectively arranged to support the said bumper and secure the same to the end of an automobile.

5. In a bumper, the combination of a pair of superimposed, vertically spaced bars having their opposite ends bent back to form loop end portions, one side of each being composed of vertically, converging ends, which, are compressed into horizontally aligned inward extensions, the said extensions being substantially parallel with the body of the said bars but spaced somewhat therefrom, one of the said bars at each end of the bumper being somewhat longer than the other adjacent one to provide for an integral angular supporting bracket, and means to fasten said bars together at the said alining point.

In testimony whereof I affix my signature.

MONTGOMERY W. McCONKEY.